United States Patent
Lewis et al.

(10) Patent No.: US 7,231,215 B2
(45) Date of Patent: Jun. 12, 2007

(54) METHOD AND A CENTRAL CONTROL UNIT FOR CHANNEL SWITCHING IN A PACKET-BASED WIRELESS COMMUNICATION NETWORK

(75) Inventors: Michael Lewis, Märsta (SE); Mikael Hjelm, Västerås (SE)

(73) Assignee: Infineon Technologies Wireless Solutions Sweden AB, Kista (SE)

( * ) Notice: Subject to any disclaimer, the term of this patent is extended or adjusted under 35 U.S.C. 154(b) by 415 days.

(21) Appl. No.: 10/703,983

(22) Filed: Nov. 7, 2003

(65) Prior Publication Data

US 2004/0146022 A1 Jul. 29, 2004

Related U.S. Application Data

(60) Provisional application No. 60/424,591, filed on Nov. 7, 2002.

(51) Int. Cl.
*H04Q 7/20* (2006.01)

(52) U.S. Cl. ............. 455/450; 455/434; 455/435.1; 455/436; 455/451; 455/452.1; 370/331; 370/338

(58) Field of Classification Search ............. 455/62, 455/434, 436–439, 450–452.1, 507, 435.1, 455/435.2, 41.2, 41.3; 370/331, 338; 342/159; 709/225
See application file for complete search history.

(56) References Cited

U.S. PATENT DOCUMENTS 5,912,921 A 6/1999 Warren et al. ............... 375/220
6,697,013 B2 * 2/2004 McFarland et al. ......... 342/159
6,738,599 B2 * 5/2004 Black et al. ................. 455/62
7,024,188 B2 * 4/2006 Khun-Jush et al. ......... 455/423
2002/0188723 A1 * 12/2002 Choi et al. ................... 709/225
2003/0002456 A1 1/2003 Soomro et al. ............. 370/328
2003/0107512 A1 * 6/2003 McFarland et al. ......... 342/159
2003/0171116 A1 * 9/2003 Soomro ...................... 455/434
2004/0203474 A1 * 10/2004 Miller et al. ................. 455/69

FOREIGN PATENT DOCUMENTS

EP 1 248 477 A1 4/2001
EP 1 206 070 A2 10/2001

* cited by examiner

*Primary Examiner*—Steve M. D'Agosta
(74) *Attorney, Agent, or Firm*—Baker Botts L.L.P.

(57) ABSTRACT

In a packet-based communication network a central control unit indicates its presence on the first channel by in addition to data traffic transmits regular beacons with a specified time interval, and upon detecting radar signals on a first channel the central control unit transmits a channel switch message and immediately switches to a second channel and resumes data traffic on that second channel, thereafter repeatedly transmitting a channel switch message on the first channel and a beacon on the second channel by switching back to the first channel to transmit second channel switch messages (either contained in beacons or separately) and switching back to the second channel to transmit regular beacons for each permissible beacon transmission time slot, until as many devices as possible associated with the central control unit has followed to the second channel.

13 Claims, 5 Drawing Sheets

METHOD AND A CENTRAL CONTROL UNIT FOR CHANNEL SWITCHING IN A PACKET-BASED WIRELESS COMMUNICATION NETWORK

CROSS REFERENCE TO RELATED APPLICATION

This application claims the benefit of U.S. provisional application No. 60/424,591 filed Nov. 7, 2002, the contents of which are hereby incorporated by reference in their entirety.

TECHNICAL FIELD OF THE INVENTION

The invention relates to multi-channel packet-based communication networks in general, more specifically to a central control unit in a wireless local area network and a method for channel switching in such a network.

BACKGROUND OF THE INVENTION

The 802.11a wireless local area network (WLAN) standard defines operations in the 5 GHz radio frequency band. In this frequency band, there are regulatory requirements, at least in Europe, to avoid transmissions in frequency bands or channels that are occupied by radar signals. Since these radar signals do not necessarily remain on a single channel, it might be necessary to cease normal data transmissions or data traffic on one channel and change to another channel so as not to disturb the radar. Another circumstance in which a channel switch may be necessary is if a channel has become subject to high interference. In this case, it is not necessary to cease transmission but the probability of receiving a transmission of data successfully is sufficiently low that the effect on the data output is very similar.

The so-called 802.11h draft standard specifies a method for channel switching, whereby a central control unit or controller in a network can indicate to the other wireless devices associated with it that it will change to another channel by a message transmitted either as part of the regular announcement (called the beacon in 802.11), or in a separate channel switch announcement which contains the message. This message causes a channel switch to be scheduled either immediately after the current transmission, or before the Nth subsequent beacon transmission with repeat transmissions of the channel switch message in each beacon leading up to the actual channel switch time.

The reason for delaying the channel switch in this manner is that a number of stations or devices in the network may be in so-called power-save or sleep mode and thereby unable to receive the messages. A graphical description of this so-called STA sleep functionality can be found in FIG. 1. According to the 802.11 protocol, these sleeping stations or devices are required to return to operating condition shortly before each expected beacon transmission time in order to check for pending traffic. Hence, the known method implies that the central controller repeats the message in subsequent beacons until all stations associated with the central controller are guaranteed to have awoken from power-save or sleep mode. This procedure is shown graphically in FIG. 2. A flow-chart of the known method is shown in FIG. 3.

A drawback of this known method is that, according to certain regulatory requirements in the standard, all normal data traffic on a channel must cease once radar signals have been detected on the channel (i.e. after the first channel switch announcement sent by the central controller). The requirements allow sending the beacons on the old channel enough times to ensure that all connected devices have heard the announcement, typically 10 seconds total with a maximum of 20 ms control traffic accumulated. This means that all the currently active devices or terminals in the network must cease sending data traffic until all of the necessary beacon messages have been sent (with a typical spacing between beacons of 0.1 s and a typical sleep duration in the range of some seconds), before the channel switch occurs and the terminals can resume operation on the new channel. This causes an undesirable disruption in the data traffic that is particularly disastrous for data traffic with so called quality of service (QoS) requirements on maximum delay, such as video or voice traffic.

A second drawback of the known method is that if the channel switch is made too quickly, with too few repeats of the announcements, there might be terminals or devices in the network that are left without a central control unit on the old channel. This means that the terminal or device must start searching through a list of frequencies or channels to try to find the old central controller or an alternative one, which is time consuming. In QoS terms, this will be a lost link.

A third drawback of the known method is that if the announcements are repeated many times, there will be a loss of traffic during the times when the announcements are made which will also lead to a lost link.

SUMMARY OF THE INVENTION

Due to the above mentioned problems there is a need for a method that limits the disruption in the data traffic caused by channel switching in response to detection of radar signals or interference on a channel, while still ensuring that as many associated devices as possible can detect the channel switch.

The method according to the invention solves the problem by the central control unit upon detection of radar signals on a first channel announcing an immediate channel switch; then switching channel and resuming traffic on a second channel as soon as possible. To make sure that all devices or terminals connected to or associated with the central control unit hear at least one such announcement, the central control unit sends double beacon messages, switching back to the first channel to repeat the beacon message with the channel switch announcement (or alternatively, sending a separate channel switch announcement) as well as sending beacons to indicate its presence on the second channel (without a channel switch message).

An advantage of the present invention is that it provides a fast channel switch for those terminals or devices that are active at the time of the first channel switch announcement, while maintaining stable operation for those devices that are in sleep mode or fail to receive beacons due to interference.

BRIEF DESCRIPTION OF THE DRAWING

The invention will be described more in detail below with reference to the appended drawings in which.

DESCRIPTION OF A PREFERRED EMBODIMENT OF THE INVENTION

The invention is easiest described by using the 802.11h mechanism to perform a channel switch; the 802.11 beacon mechanism, and the 802.11 power save mechanism. The 802.11 beacon functionality specifies that regular beacons must be sent at so-called target beacon transmission time slots on a channel, with a specified spacing called a beacon interval. The length of this is implementation dependent but is typically around 100 ms.

Figure 1:
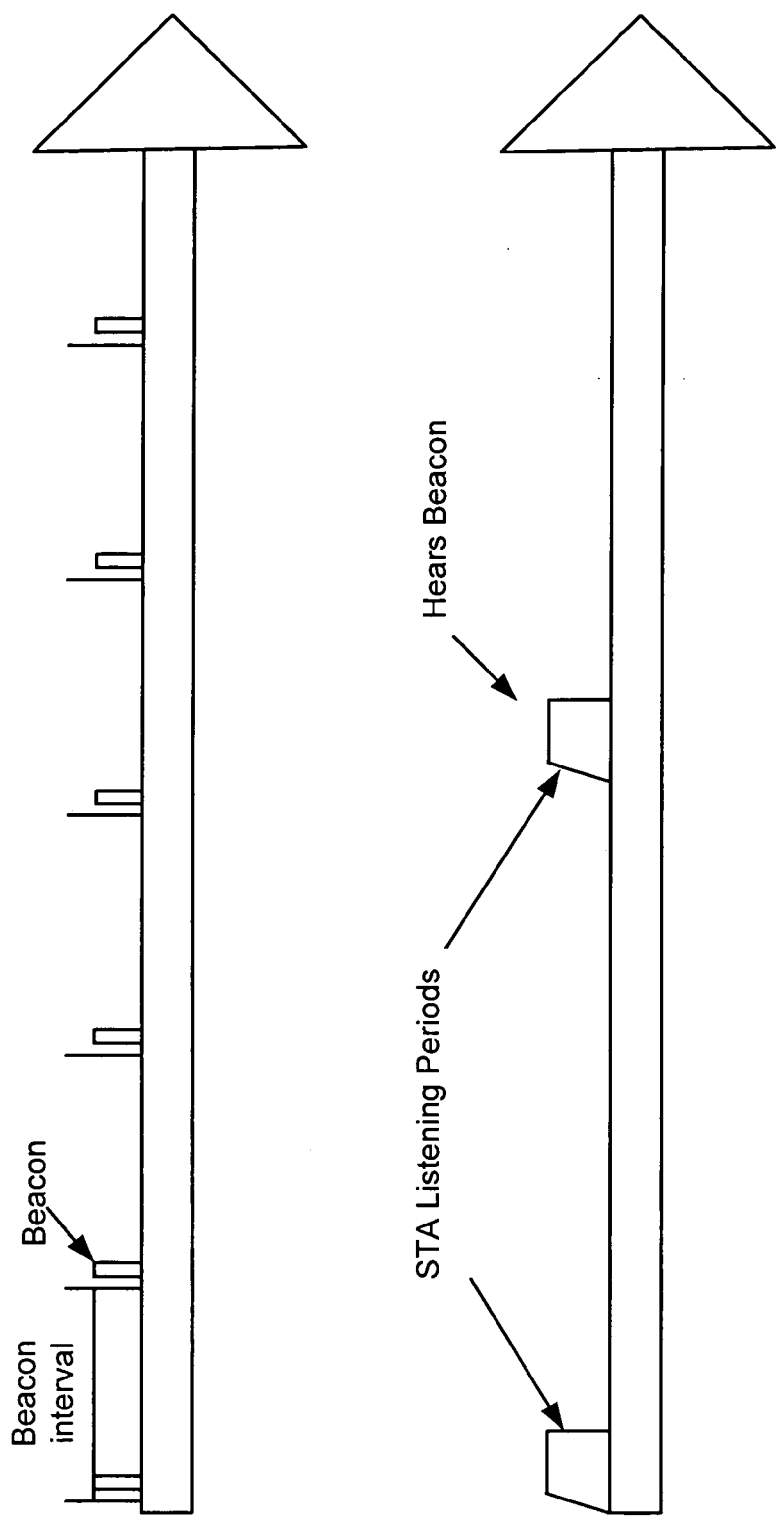
FIG. 1 illustrates the STA sleep functionality of terminals in a network.
Figure 2:
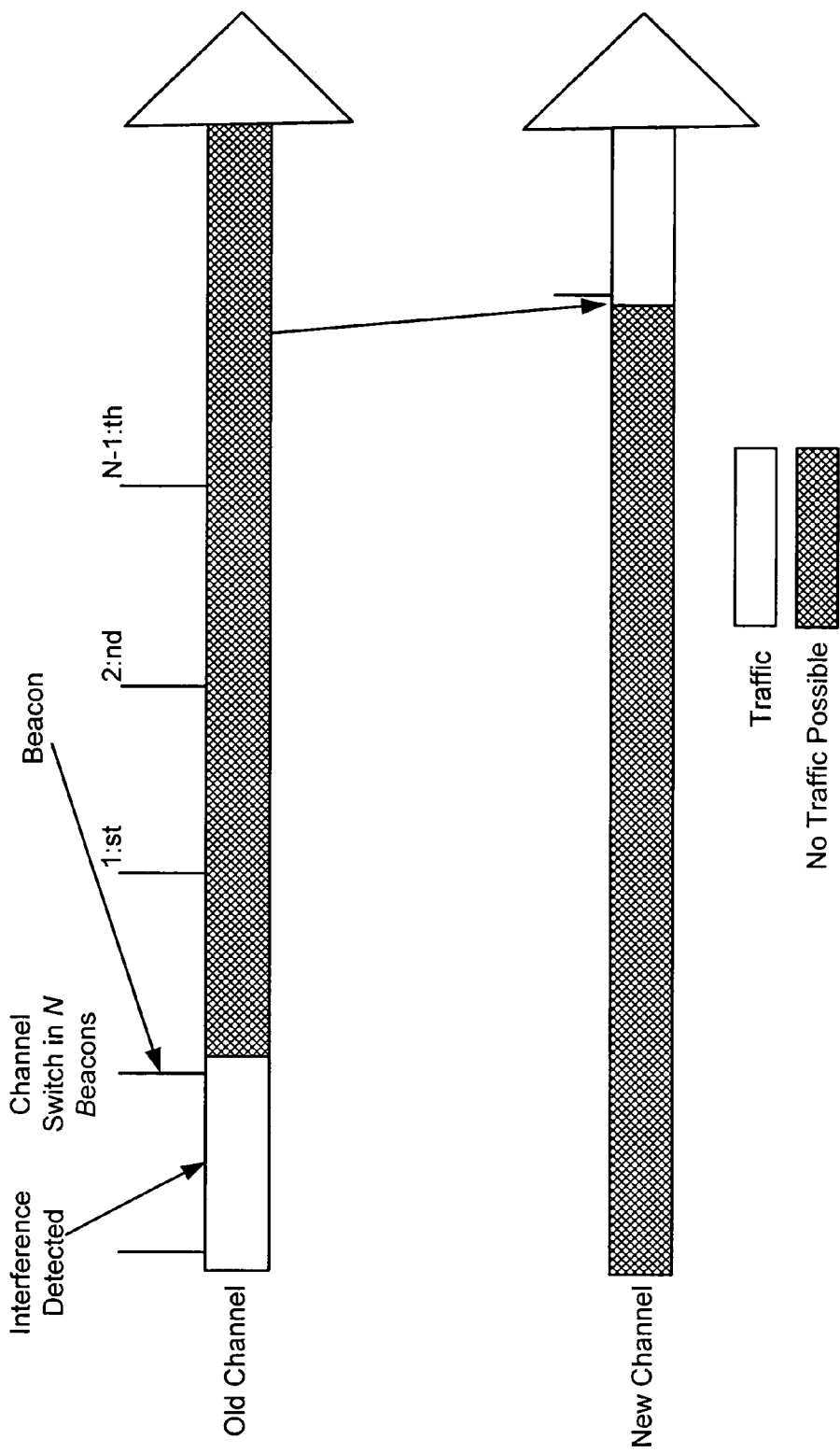
FIG. 2 illustrates a known channel switching method.
Figure 3:
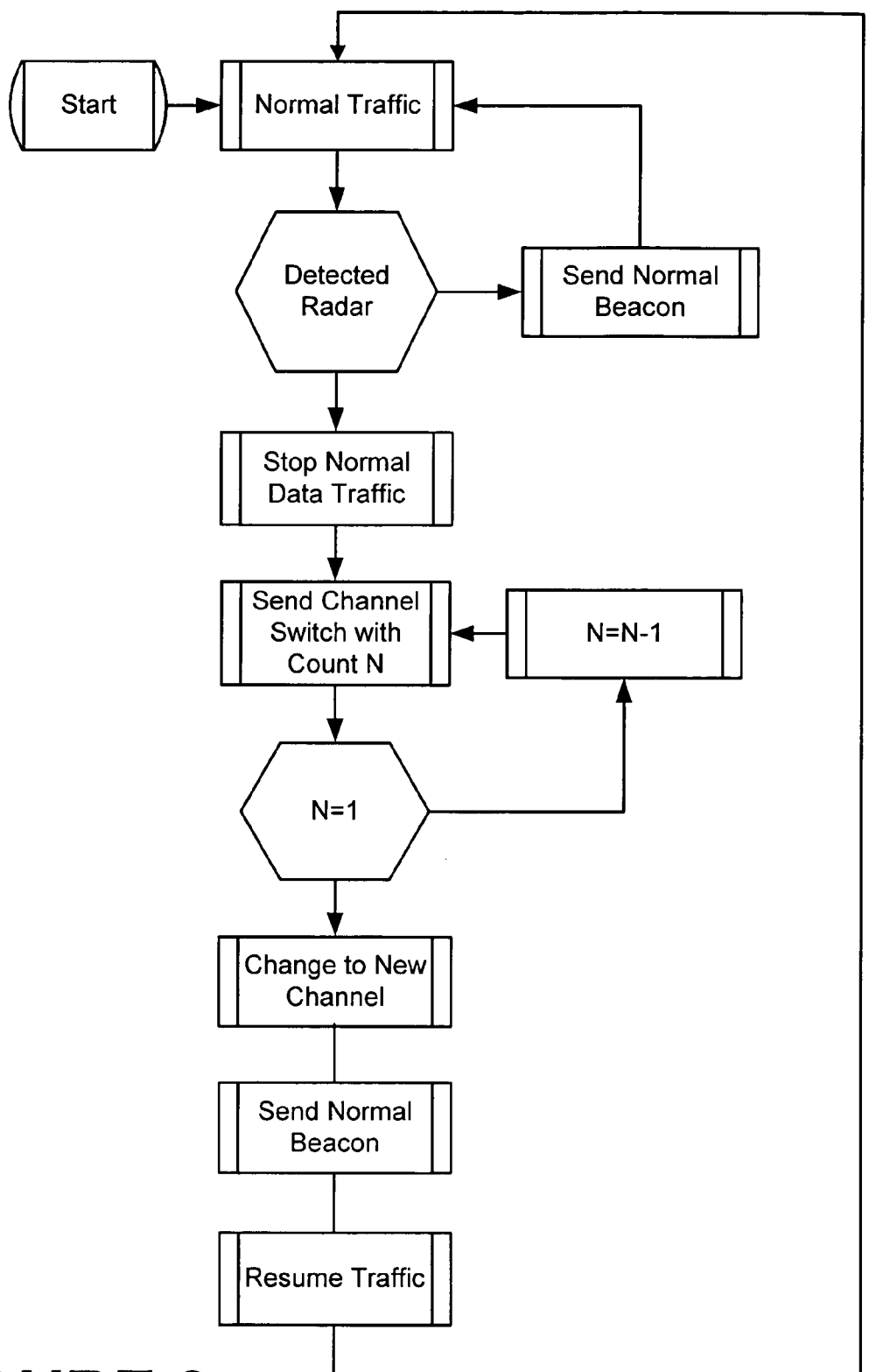
FIG. 3 illustrates a flow chart of the known method of channel switching.
Figure 4:
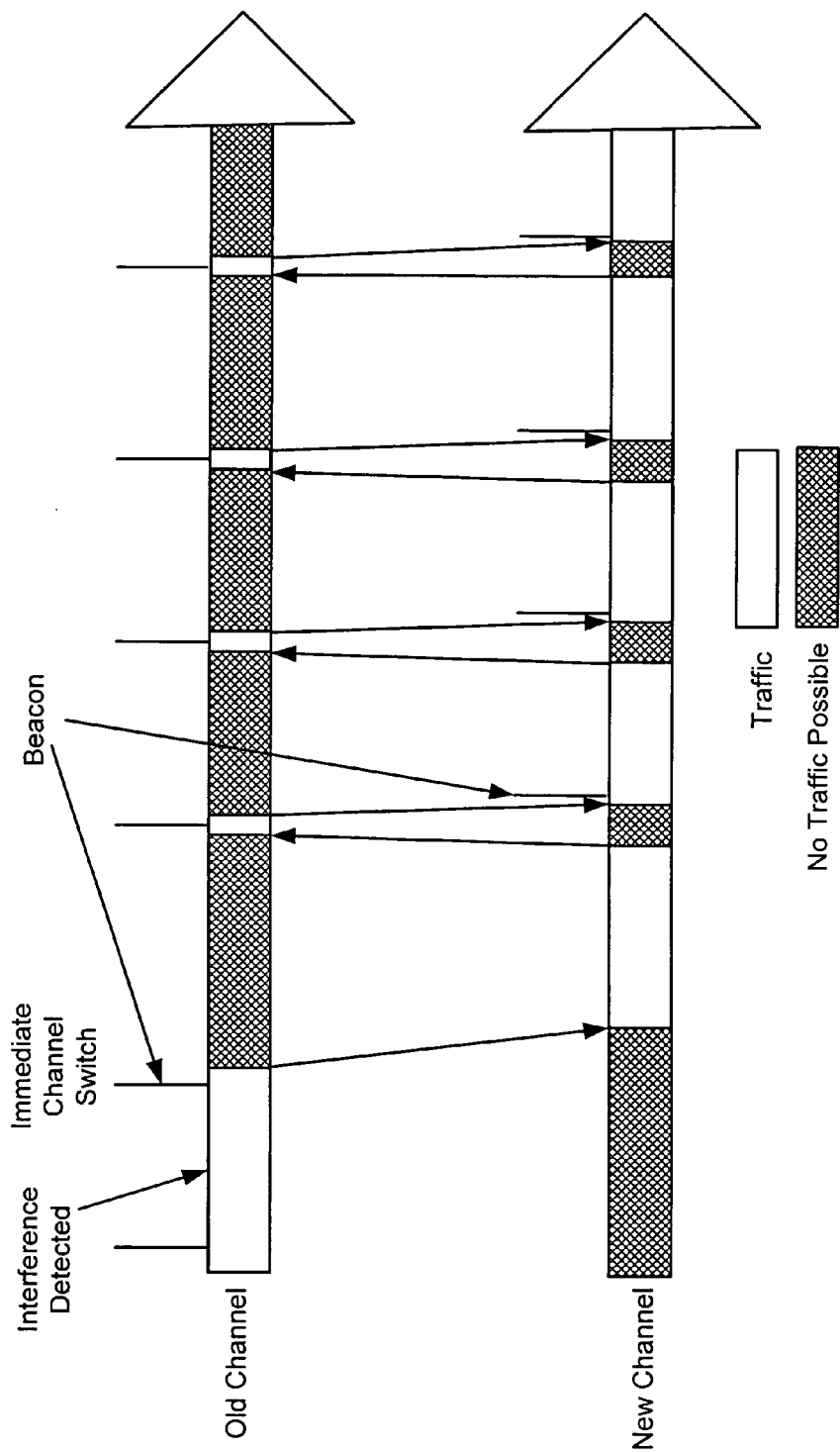
FIG. 4 illustrates an embodiment of a method according to the invention.
Figure 5:
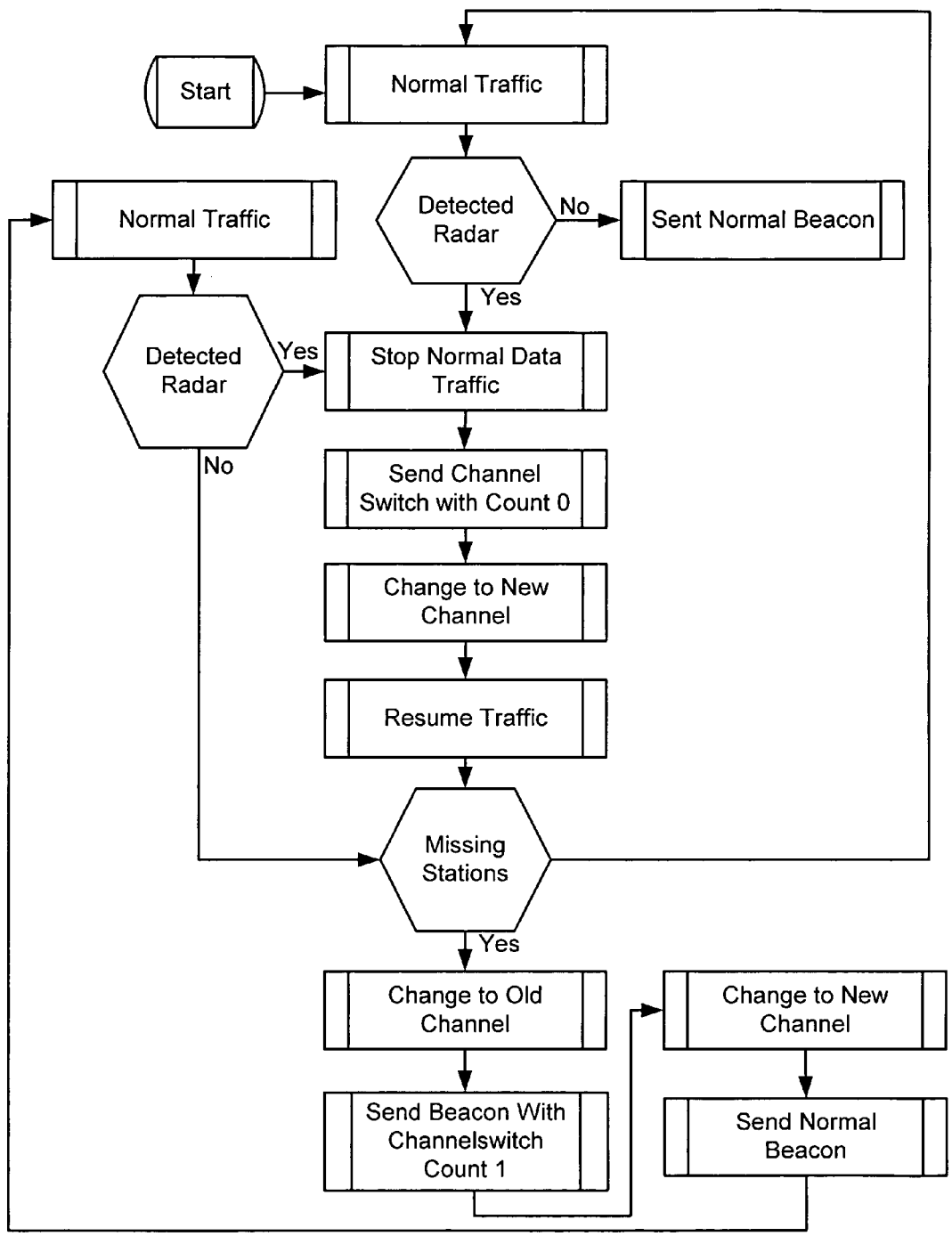
FIG. 5 illustrates a flow chart of an embodiment of the method according to the invention.

A method and a central control unit according to the invention are described in relation to FIG. 4 and FIG. 5, but also other embodiments are possible.

In a wireless packet-based communication network, data traffic on a first channel or frequency is controlled by a central control unit that indicates its presence on the first channel by transmitting announcements or beacons at so called beacon transmission time slots that are separated by specified time intervals. A number of terminals or devices are associated with the central control unit. These devices are either active i.e. transmitting or receiving data or in so called power-save or sleep-mode i.e. only listening to or checking the first channel for any pending data traffic at specified time intervals. In addition to directing the data traffic the central control unit also checks the first channel for possible interference e.g. radar signals, either directly or by proxy, i.e. requesting other devices to perform measurements.

Upon detection of radar signals on the first channel see FIG. 4 and FIG. 5, the central control unit according to the invention locates and selects an alternative second channel that is determined free from radar signals. Subsequently, the central control unit transmits a first channel switch message (either immediately in a separate channel switch message, or contained in the beacon at the first possible beacon transmission slot) with a channel switch count set to zero, thus implying to active and/or listening devices in the communications network that it will switch to the second channel immediately after the transmission. The channel switch message includes an address to the second channel, which the central control unit has determined free from radar signals or other interference.

The central control unit then leaves the first channel as soon as the first channel switch beacon is transmitted. The data traffic is subsequently resumed on the second channel as soon as the central control unit has had a chance to switch to the second channel, which will be a very brief interval. When a beacon transmission interval has passed since the last beacon was transmitted on the first channel, e.g. typically 100 ms, the central control unit switches back to the first channel and sends a second channel switch message, thus encouraging devices that hear the channel switch message to change to the second channel. This second channel switch message can be sent in a beacon, with the channel switch count set to one, thus encouraging devices that hear the channel switch message to switch to the second channel before the next expected beacon transmission time slot. Alternatively, the second channel switch message can be sent in a separate channel switch message with the channel switch count set to zero, thus encouraging devices that hear the channel switch message to immediately switch to the second channel. The central control unit then switches back to send a regular beacon on the second channel, see FIG. 4 and FIG. 5. Sending the channel switch announcement in a beacon with a channel switch count of one ensures that devices receive a regular flow of beacons and have adequate time to change channel, while sending the channel switch announcement in a separate message with a channel switch count of zero causes newly-awakened devices to move as rapidly as possible to the new channel but may lead to them missing the following regular beacons on the second channel.

Regular beacons, by definition, are beacons that are sent by the central control unit to indicate its presence on a specific channel.

The regular beacon transmission on the second channel is then slightly delayed, but this is entirely allowable since all devices in the network must be able to accept delays in beacon transmission as they can occur due to other devices transmitting at the target beacon transmission time.

In order to enable terminals or devices that are in sleep mode, or that do not hear the beacons due to interference, to hear at least one channel switch message, the second channel switch message with the channel switch count set to one on the first channel is repeated until a predetermined number of second channel switch messages have been sent, or until a predetermined time interval, e.g. 10 seconds, has elapsed from the transmission of the first channel switch beacon, or until the total accumulated transmission time of the first and second channel switch messages reaches a certain specified value, e.g. 20 ms.

As a result the central control units either transmits double beacons (except for the first beacon in the case where the first channel switch message is sent in a beacon) for each permissible beacon transmission time slot, but on two different channels and with a short delay between the two beacons; or alternatively send a separate channel switch message on the first channel at the beacon transmission time slot followed shortly afterwards by a regular beacon on the second channel. The only interruption in the data traffic for those devices that hear the first channel switch message on the first channel and adheres to the channel switch is the channel switch time, which should be small e.g. below 5 ms. This should be acceptable for most QoS applications: terminals that are in sleep mode have, by definition, no active QoS links.

The invention exploits the fact that the regular beacon transmissions on a channel are allowed to be delayed somewhat, since according to the 802.11 standard protocol it must be accepted that some other station will be transmitting when the beacon should have been sent, so that the central control unit must delay its own transmission. This assures that a device or terminal that hears the first channel switch message and adheres to it only hears the first regular beacon sent on the second channel, and devices that hear any one of the second channel switch messages switches channels before the next beacon transmission slot, thereby only hearing any one of the regular beacons on the second channel.

One other possible complementary step, in order to enable as many of the devices connected to the central control unit as possible to notice the channel switch, is to broadcast a message on the second channel which in some manner detects the number of terminals that have followed the central control unit to the second channel. By comparing this number to the number of terminals originally associated with the central control unit at the first channel, the central control unit can determine if the second channel switch message transmissions should continue or if terminals not at the second channel should be counted as lost links.

There is also a possibility to use the method according to the invention if the interference level on the first channel is so high that it is almost impossible for devices that are associated to the first channel to hear the messages. The channel switch is then motivated by the interference level, which could be due to radar signals or any other interference. The method according to the invention would then make it possible for those devices that hear the channel switch messages to resume traffic on the second channel while the repeated channel switch messages on the first channel increases the probability that the other stations or devices that were left on the first channel hear a message as well.

For the case that the central control unit is an 802.11 access point (abbreviated by AP), through which all traffic is routed, there is a possibility of missing traffic during the times that the AP is transmitting messages on the first channel (although this is small since stations should avoid transmitting normal data after the target beacon transmission time). This situation can be avoided by an additional step, which is to use the so-called 802.11h quiet period to indicate that the AP cannot receive traffic to make sure that the stations do not try to communicate with the AP when it is off the channel. The quiet period is defined by a message in the previous beacon transmission, and specifies an interval during which no stations or devices are allowed to transmit: the original use for this was to provide a time when radar detection measurements could be performed.

The invention has been described in the context of an 802.11/802.11h wireless LAN system. However, it is applicable to any communication network that employs comparable mechanisms.

We claim:

1. A method of channel switching in a packet-based wireless communication network, where data traffic takes place on a first channel that is controlled by a central control unit which indicates its presence on the first channel by transmitting regular beacons with a specified time interval, and where devices associated with the central control unit are active, or leaving sleep mode to listen for pending data traffic at specified time intervals, comprising the steps of:
    detecting a radar signal on the first channel and in response to the detection interrupting the data traffic on the first channel,
    transmitting a first channel switch message on the first channel, signaling to active and/or listening devices that a channel switch to a second channel will occur, wherein a channel switch count is set to zero in the first channel switch message, thus signaling to active and/or listening devices that a channel switch will occur immediately after the beacon transmission;
    switching to and resuming data traffic on the second channel,
    transmitting a second channel switch message on the first channel, signaling to active and/or listening devices that a channel switch has occurred, wherein a channel switch count is set to one in the second channel switch message, thus signaling to active and/or listening devices that a channel switch will occur before the next beacon transmission, and
    repeatedly transmitting second channel switch messages at predetermined intervals on the first channel and transmitting a regular beacon on the second channel.

2. The method according to claim 1, wherein repeatedly transmitting second channel switch messages at predetermined intervals on the first channel and transmitting a regular beacon on the second channel are continued until a select number of second channel switch messages have been sent on the first channel.

3. The method according to claim 1, wherein repeatedly transmitting second channel switch messages at predetermined intervals on the first channel and transmitting a regular beacon on the second channel are continued until a predetermined time interval has passed from the first channel switch message transmission.

4. The method according to claim 1, wherein repeatedly transmitting second channel switch messages at predetermined intervals on the first channel and transmitting a regular beacon on the second channel are continued until the total transmission time for the first and second channel switch messages reaches a predetermined value.

5. The method according to claim 1, further comprising: canceling transmitting second channel switch messages on the first channel, while maintaining data traffic on the second channel.

6. A method of channel switching in a packet-based wireless communication network, where data traffic takes place on a first channel that is controlled by a central control unit which indicates its presence on the first channel by transmitting regular beacons with a specified time interval, and where devices associated with the central control unit are active, or leaving sleep mode to listen for pending data traffic at specified time intervals, comprising the steps of:
    detecting a radar signal on the first channel and in response to the detection interrupting the data traffic on the first channel,
    transmitting a first channel switch message on the first channel, signaling to active and/or listening devices that a channel switch to a second channel will occur, wherein a channel switch count is set to zero in the first channel switch message, thus signaling to active and/or listening devices that a channel switch will occur immediately after the beacon transmission;
    switching to and resuming data traffic on the second channel,
    transmitting a second channel switch message on the first channel, signaling to active and/or listening devices that a channel switch has occurred, wherein a channel switch count is set to zero in the second channel switch message, thus signaling to active and/or listening devices that a channel switch will occur immediately, and
    repeatedly transmitting second channel switch messages at predetermined intervals on the first channel and transmitting a regular beacon on the second channel.

7. The method according to claim 6, wherein repeatedly transmitting second channel switch messages at predetermined intervals on the first channel and transmitting a regular beacon on the second channel are continued until a select number of second channel switch messages have been sent on the first channel.

8. The method according to claim 6, wherein repeatedly transmitting second channel switch messages at predetermined intervals on the first channel and transmitting a regular beacon on the second channel are continued until a predetermined time interval has passed from the first channel switch message transmission.

9. The method according to claim 6, wherein repeatedly transmitting second channel switch messages at predetermined intervals on the first channel and transmitting a regular beacon on the second channel are continued until the total transmission time for the first and second channel switch messages reaches a predetermined value.

10. The method according to claim 6, further comprising: canceling transmitting second channel switch messages on the first channel, while maintaining data traffic on the second channel.

11. A central control unit for channel switching in a packet-based wireless communication network, where data traffic takes place on a first channel that is controlled by the central control unit provided to indicate its presence on the first channel by, transmitting regular beacons with a specified time interval, and where devices associated with the central control unit are active or leaving sleep mode to listen for pending data traffic at specified time intervals, comprising:

means to detect radar signals on the first channel and in response to the detection interrupt the data traffic on the first channel, means to transmit a first channel switch message at the first possible beacon transmissions slot on the first channel and thereby signal to active and/or listening devices that a channel switch to a second channel will occur, wherein a channel switch count is set to zero in the first channel switch message, thus signaling to active and/or listening devices that a channel switch will occur immediately after the beacon transmission;

means to transmit a second channel switch message on the first channel and thereby signal to active and/or listening devices that a channel switch will occur, and means to transmit second channel switch messages at predetermined intervals on the first channel and to switch back to the second channel to transmit regular beacons, wherein a channel switch count is set to zero or one in the second channel switch message, thus signaling to active and/or listening devices that a channel switch will occur immediately or before the next beacon transmission, respectively.

12. The central control unit according to claim 11, wherein each second channel switch message is contained in a beacon.

13. The central control unit according to claim 11, wherein the central control unit comprises means to cancel transmission of the second channel switch messages on the first channel when a predetermined number of second channel switch messages have been transmitted or after a predetermined time interval from the transmission of the first channel switch message, or when the total transmission time of the first and second channel switch messages reaches a specific value and to maintain the data traffic and transmission of regular beacons on the second channel.

* * * * *